United States Patent
Cheng

[11] Patent Number: 5,577,330
[45] Date of Patent: Nov. 26, 1996

[54] MEASURING DEVICE

[75] Inventor: Sidney Cheng, Kowloon, Hong Kong

[73] Assignee: Advanced Technologies Limited, Hong Kong

[21] Appl. No.: 435,548

[22] Filed: May 5, 1995

[51] Int. Cl.⁶ .................................................. G01B 3/12
[52] U.S. Cl. .............................. 33/772; 33/776; 33/773
[58] Field of Search .............................. 33/772, 773, 776, 33/707, 121, 775, 779, 780, 781, 782

[56] References Cited

U.S. PATENT DOCUMENTS

| | | | |
|---|---|---|---|
| 5,099,775 | 3/1992 | Jimenez et al. | 33/773 |
| 5,161,313 | 11/1992 | Rijlaarsadam | 33/773 |
| 5,477,622 | 12/1995 | Skalnik | 33/773 |
| 5,485,682 | 1/1996 | Le Breton | 33/773 |

FOREIGN PATENT DOCUMENTS 936422  12/1955  Germany .................................. 33/776

*Primary Examiner*—Christopher W. Fulton
*Attorney, Agent, or Firm*—Gunn, Lee & Miller, P.C.

[57] ABSTRACT

An electronic hand holdable measuring device for measuring dimension of an article by rolling the device across surface of the article includes a housing 10 and a roller sub-assembly 11. When the roller is worn it can be readily replaced together with an associated raster disc 23 forming part of the sub-assembly. An optical reader is permanently mounted inside the housing.

8 Claims, 1 Drawing Sheet

MEASURING DEVICE

BACKGROUND OF THE INVENTION

1. Field of the Invention

This invention relates to a measuring device and more particularly to a device for obtaining a volume related measurement, such as the dimensional weight or the volume, of an article, such as a parcel.

The dimensional weight of an article is a notional weight of the article calculated at least to some extent in accordance with the dimensions of the article and more particularly but not necessarily exclusively calculated from the dimensions of the article assuming that the article is of uniform predetermined density.

2. Description of the Prior Art

Airline freight forwarding businesses generally bill customers in accordance with the weight of a parcel. Airlines, on the other hand, tend to bill the freight forwarding businesses in accordance with the space occupied. Thus, the airline freight forwarding businesses can make a loss on parcels containing low density articles. Some airline freight forwarding businesses first weigh a parcel and then take a subjective view as to whether the parcel is large for its weight. If it is, the parcel is then measured using a tape measure and the dimensional weight is calculated for costing purposes. This is a labour intensive exercise and because any decision to measure the dimensions of a parcel is based on the subjective view of an operator, errors inevitably occur.

In any event, it is always necessary to input dimensions of articles and the present invention relates to measuring devices which are capable of determining the external dimensions of articles. Suitable measuring devices have already been disclosed in for example patent specification WO85/05175 in which magnetic and optical pulses are used to provide distance signals. A linear measuring device is also disclosed in U.S. Pat. No. 4760647.

The distances are determined by passing a measuring device over a surface and measuring the rotational movement of a roller mounted to the device and exposed to contact the surface. The roller must be made of gripping material so that it does not slip and as such inherently tends to wear and so that calibration of the device can become inaccurate. Presently replacement of the rollers leads to extended out-of-use time and requires skilled labour.

SUMMARY OF THE INVENTION

It is an object of the invention to overcome or at least reduce this problem.

According to the invention there is provided an electronic hand holdable measuring device for measuring dimensions of an article by rolling the device across surfaces of the article including a housing and a roller sub-assembly releasably mounted to the housing, in which the sub-assembly is arranged to generate dimension signals corresponding to rotational movement of the roller and a reader is permanently mounted inside the housing to respond to the dimension signals.

The roller sub-assembly may comprise a roller and a circular disc having an optically varying array so as to provide an optical signal for each unit of rotation of the disc.

The disc may be mounted on an axis separate from the axis of rotation of the roller and the roller is arranged to drive the disc via a belt. The belt is preferably a toothed belt.

The device may include an electrical component in the housing arranged to respond to the dimension signals and provide a summation of the total distance the device has measured, or provide a warning signal whenever the summation reaches a predetermined value. A test circuit in the housing may be arranged to record and display the effective distance measured by the device when it is rolled over a calibrating distance on a surface.

BRIEF DESCRIPTION OF THE DRAWINGS

An electronic hand holdable measuring device will now be described by way of example with reference to the accompanying drawings in which.

DESCRIPTION OF THE PREFERRED EMBODIMENTS

The device is for measuring external dimensions of articles especially articles for shipment by air. In use, the device is run across the surfaces of each article to measure the overall width, height and depth of the article. From this, a volume is calculated, and if appropriate a dimensional weight, and a shipment tariff worked out. These devices as such are already known and provide the information on displays on the device and/or by communication, that is by storing the information and later providing or generating print-out signals in some cases. In referring now to the Figures, only parts that are relevant to embodiments of the invention will be described in any detail.

Figure 1:
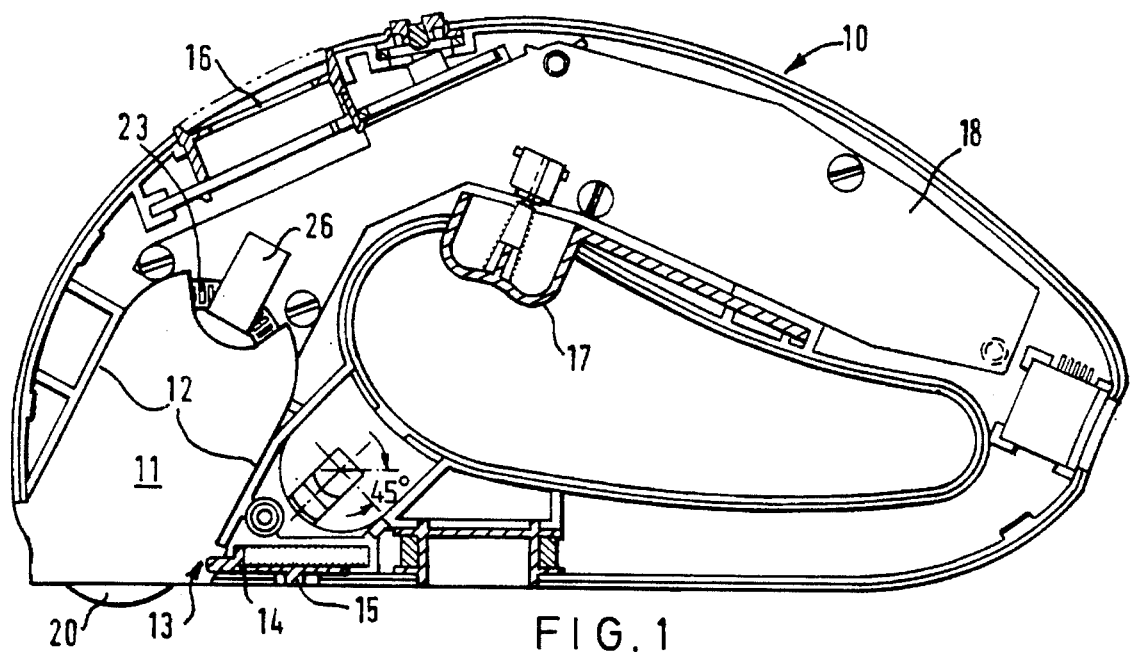
FIG. 1 is a sectional side view of the device.

In FIG. 1, the device comprises a housing 10 and a roller sub-assembly 11 releasably mounted to the housing 10. The sub-assembly 11 is a snug sliding fit into a channel 12 formed in the housing 10. The sub-assembly has a slot 13 to receive an end of a locking bolt 14 frictionally held closed. The bolt 14 is slidable adjacent and along the base of the housing 10. The bolt 14 has a lip 15 accessible from external of the housing 10 to allow manual operation of the bolt 14. Also shown in FIG. 1 is an LCD display panel 16, a trigger switch 17 which is pressed by the operator during measuring traverses across any article, and a main printed circuit board 18.

Figure 2:
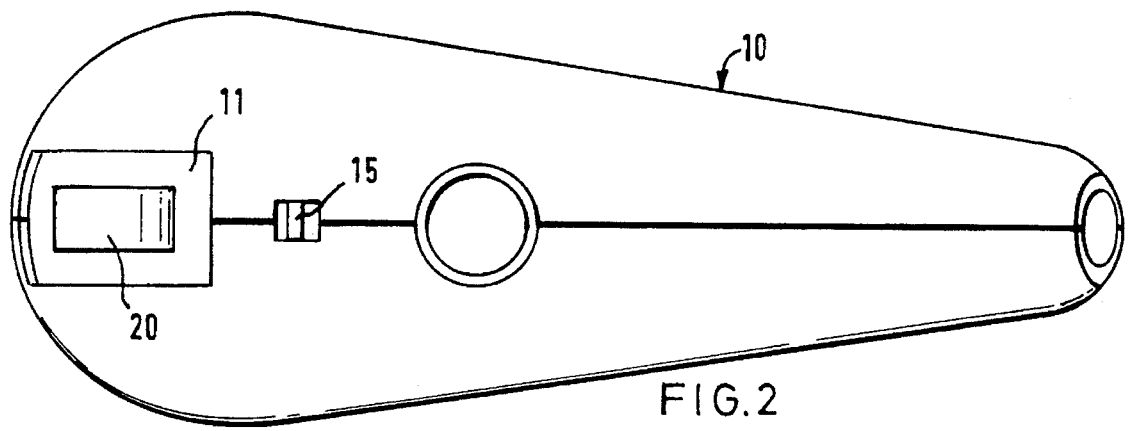
FIG. 2 is a bottom view of the device.

The sub-assembly 11 and the lip 15 are clearly visible in FIG. 2.

Figure 3:
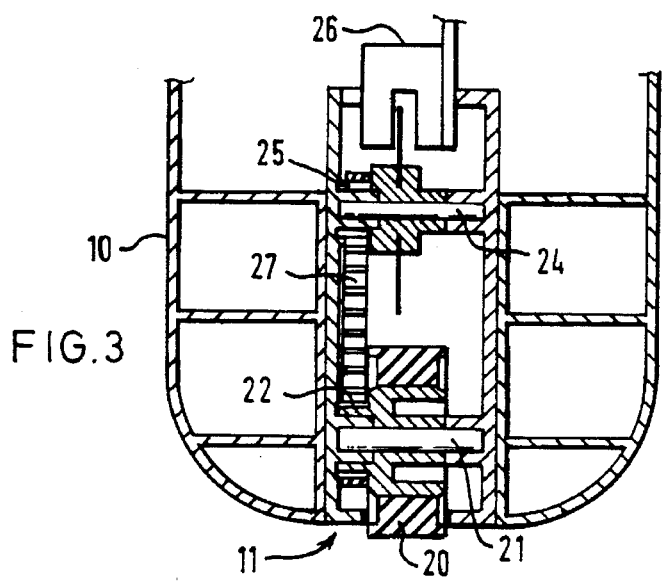
FIG. 3 is a sectional side view of part of the device to a larger scale showing a roller sub-assembly in more detail.

In FIG. 3, the roller sub-assembly 11 comprises a roller 20, mounted on a shaft 21 which carries a toothed pulley 22. A thin optical disc 23 is mounted on a second axle 24 which also has a toothed pulley 25. A toothed belt 27 mechanically connects the two pulleys 22 and 25 together. In this embodiment the roller 20 and the disc 23 are geared 1:1 and when the roller rotates the effective optical pattern or array of the disc causes signals to be generated. These signals are detected by a photo detector opposite a photo diode (not shown) mounted on the printed circuit board 18 and secured by screws in the body 26 and so as to be firmly and closely held adjacent on opposite sides of the disc 23. The body 26 and board 18 are supported by the housing 10 and does not form part of the sub-assembly 11. However, the body 26 can enter to some extent inside one end of the sub-assembly 11 as required when the sub-assembly is fully inserted in the housing 10.

Thus, in use the sub-assembly 11 is normally retained snugly inside the housing 10. It can be removed for cleaning but more usually it is removed and replaced when it is no longer within calibration. Calibration is generally tested from time to time by running the device over a test sample of known length and making sure the actual distance measured by the device is within some chosen tolerance. The described device also includes an electronic storage circuit (not shown) mounted on the circuit board 18. After a certain maximum accumulated distance measured by the sub-assembly 11, a signal is provided to indicate that the sub-assembly should be replaced.

It will be appreciated that the roller material is made of wearable material, as inherently hard-wearing material is more likely to slip and generate unreliable measuring signals and so is not normally suitable for these measuring devices. As such the roller 20 wears during use and must be replaceable from time to time. In prior proposals the rollers could only be replaced by dismantling the machine in a factory and/or by skilled persons. This is not only involved significant expense and time but also lead to a reluctance to make the changes. Thus, the prior devices were often used after being well out of calibration or otherwise unreliable and so cause loss of shipment revenue due to inaccurate billing or end customer dissatisfaction by being incorrectly charged.

As described, the sub-assembly comprises a roller and a separate disc. It would be possible to mount the disc 23 on the roller 20 or on the same axle as the roller 20 if preferred. A reader, that is the photodetector and photodiode in the body 26, in all cases remains part of or permanently fixed in the housing 10. The roller and a generator of optical, magnetic or other roller rotation dependent signals forms the easily replaceable sub-assembly. In practice, each user will tend to have one or two spare sub-assemblies for immediate replacement in his measuring device so that if at the beginning of a shift or week's work the device is out of calibration a spare sub-assembly is fitted immediately. If the storage device identifies the sub-assembly has reached a service maximum accumulated distance measurement, a new sub-assembly 11 can be fitted in a matter of seconds. It is of course possible to return used sub-assemblies to a factory for servicing and/or replacement of its components but with the described arrangement that is done without interrupting the normal operation of the measuring devices.

I claim:

1. An electronic hand holdable measuring device for measuring dimensions of an article by rolling the device across surfaces of the article comprising: a housing and a sub-assembly releasably mounted to the housing, the sub-assembly comprising a roller and a circular disc having an optically varying array so as to provide an optical siqnal for each unit of rotation of the disc, in which the sub-assembly is arranged to generate dimension signals corresponding to rotational movement of the roller and a reader is permanently mounted inside the housing to respond to the dimension signals.

2. A device according to claim 1, in which the disc is mounted on an axis separate from the axis of rotation of the roller and the roller is arranged to drive the disc via a belt.

3. A device according to 3, in which the belt is a toothed belt.

4. A device according to claim 1 further comprising: an electrical component in the housing arranged to respond to the dimension signals and provide a summation of the total distance the device has measured.

5. A device according to claim 1 further comprising: a test circuit in the housing arranged to record and display the effective distance measured by the device when it is rolled over a calibrating distance on a surface.

6. A device according to claim 1 further comprising: an electrical component in the housing arranged to respond to the dimension signals and provide a warning signal whenever the summation reaches a predetermined value.

7. An electronic hand holdable measuring device for measuring dimensions of an article by rolling the device across surfaces of the article comprising: a housing and a roller sub-assembly releasably mounted to the housing, wherein the sub-assembly is arranged to generate dimension signals corresponding to rotational movement of the roller and a reader is permanently mounted inside the housing to respond to the dimension signals, the roller sub-assembly further comprising a roller and a circular disc having an optically varying array so as to provide an optical signal for each unit of rotation of the disc, the disc being mounted on an axis separate from the axis of rotation of the roller and the roller arranged to drive the disc via a belt.

8. A device according to claim 7 wherein the belt is a toothed belt.

* * * * *